(12) United States Patent
Pflaum et al.

(10) Patent No.: US 11,332,109 B2
(45) Date of Patent: May 17, 2022

(54) PEDAL FORCE SIMULATOR DEVICE

(71) Applicant: Robert Bosch GmbH, Stuttgart (DE)

(72) Inventors: Dieter Pflaum, Krugzell (DE);
Matthias Kistner, Bretzfeld (DE);
Simon Hansmann, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 648 days.

(21) Appl. No.: 16/341,270

(22) PCT Filed: Aug. 7, 2017

(86) PCT No.: PCT/EP2017/069900
§ 371 (c)(1),
(2) Date: Apr. 11, 2019

(87) PCT Pub. No.: WO2018/068918
PCT Pub. Date: Apr. 19, 2018

(65) Prior Publication Data
US 2021/0291797 A1     Sep. 23, 2021

(30) Foreign Application Priority Data
Oct. 12, 2016   (DE) .......................... 102016219808.4

(51) Int. Cl.
*B60T 8/40*     (2006.01)
*F15B 15/20*    (2006.01)
(Continued)

(52) U.S. Cl.
CPC .............. *B60T 8/409* (2013.01); *F15B 15/20* (2013.01); *F16F 1/32* (2013.01); *F16F 3/02* (2013.01);
(Continued)

(58) Field of Classification Search
CPC ...... B60T 8/409; B60T 8/4081; B60T 8/4077; B60T 8/4086; F15B 15/20; F15B 15/02
See application file for complete search history.

(56) References Cited

U.S. PATENT DOCUMENTS 8,757,734 B2 *  6/2014  Toyohira ................. B60T 7/042
                                                    303/119.3
10,053,073 B2 *  8/2018  Weh ........................ B60T 8/409
(Continued)

FOREIGN PATENT DOCUMENTS

CN   104709248 A    6/2015
CN   204567627 U    8/2015
(Continued)

OTHER PUBLICATIONS

International Search Report dated Nov. 7, 2017 of the corrrresponding International Application PCT/EP2017/069900 filed Aug. 7, 2017.

*Primary Examiner* — Dustin T Nguyen
(74) *Attorney, Agent, or Firm* — Norton Rose Fulbright US LLP; Gerard Messina

(57) ABSTRACT

A pedal force simulator device includes: a pressure piston actuatable by a brake pedal and axially moveably mounted in a housing; and at least two disk spring stacks connected in series, each disk spring stack having at least two disk springs, at least two of the disk spring stacks having different spring constants, and the disk spring stacks being situated in the housing between an end face of the pressure piston and an axial stop of the housing. At least one of the disk spring stacks includes an axial receiving recess, in which a spring element, which can be elastically deformed by the pressure piston, is situated, one end of the spring element being supported on the pressure piston and the other end being supported on one of the disk spring stacks.

13 Claims, 2 Drawing Sheets

(51) Int. Cl.
*F16F 3/02* (2006.01)
*F16F 1/32* (2006.01)
*G05G 5/03* (2008.04)

(52) U.S. Cl.
CPC ............ *G05G 5/03* (2013.01); *F16F 2228/08* (2013.01); *F16F 2230/007* (2013.01); *F16F 2232/08* (2013.01)

(56) References Cited

U.S. PATENT DOCUMENTS

| | | | |
|---|---|---|---|
| 10,507,812 B2* | 12/2019 | Weh | G05G 5/03 |
| 10,744,984 B2* | 8/2020 | Weh | F15B 15/24 |
| 10,773,697 B2* | 9/2020 | Weh | F15B 15/24 |
| 10,919,507 B2* | 2/2021 | Anderson | B60T 8/409 |
| 11,059,465 B1* | 7/2021 | Weh | F15B 15/02 |
| 2008/0223670 A1 | 9/2008 | Toyohira et al. | |
| 2016/0031424 A1 | 2/2016 | Weh et al. | |

FOREIGN PATENT DOCUMENTS

| | | |
|---|---|---|
| EP | 2896539 A2 | 7/2015 |
| GB | 2273961 A | 7/1994 |
| JP | S4873668 A | 10/1973 |
| WO | 2015033292 A1 | 3/2015 |

\* cited by examiner

PEDAL FORCE SIMULATOR DEVICE

CROSS-REFERENCE TO RELATED APPLICATIONS

The present application is the national stage of International Pat. App. No. PCT/EP2017/069900 filed Aug. 7, 2017, and claims priority under 35 U.S.C. § 119 to DE 10 2016 219 808.4, filed in the Federal Republic of Germany on Oct. 12, 2016, the content of each of which are incorporated herein by reference in their entireties.

FIELD OF THE INVENTION

The present invention relates to a pedal force simulator device, including a pressure piston actuatable by a brake pedal and that is axially moveably mounted in a housing, and including at least two disk spring stacks connected in series, each disk spring stack having at least two disk springs, at least two of the disk spring stacks having different spring stiffnesses, and the disk spring stacks being situated in the housing between an end face of the pressure piston and an axial stop of the housing.

BACKGROUND

A pedal force simulator device known from the related art includes at least two disk spring stacks connected in series, each disk spring stack including at least two disk springs each. The disk spring stacks are situated pre-tensioned in the housing between an end face of an axially movable pressure piston, which is actuatable by a brake pedal, and an axial stop of a housing. It is provided that at least two disk spring stacks exhibit different spring forces or spring characteristics. If the disk spring stacks are acted upon with a pressure force by the pressure piston, they are each deflected or compressed as a function of their individual spring forces or spring characteristics. In the process, they generate a restoring force on the pressure piston, which counteracts a further compression. In this way, the pedal force simulator device generates a restoring force on the brake pedal when the brake pedal is actuated. In the process, the generated restoring force simulates the brake pedal force sensation that the driver would perceive when actuating a conventional, hydraulic braking system.

SUMMARY

The pedal force simulator device according to the present invention is distinguished by the fact that at least one of the disk spring stacks includes an axial receiving recess, in which a spring element, which is elastically deformable by the pressure piston, is situated, one end of the spring element being supported on the pressure piston and the other end being supported on one of the disk spring stacks. The pedal force simulator device according to an example embodiment of the present invention has an advantage that it minimizes force jumps in a spring characteristic of the disk spring stack during a pressure application or compression of the disk spring stack, so that it conveys the brake pedal force sensation of a conventional hydraulic brake system when a brake pedal is actuated by a driver of a vehicle. This ensures that with each deflection or with each spring travel, the spring characteristic of the entire device is constant or with no force jumps in the spring force. The spring forces are dampened due to a simultaneous compression or an interaction of disk spring stack and spring element, and the generated brake pedal force sensation is thus adapted to the brake pedal force sensation corresponding to that of a hydraulic braking system. This makes the operation of the motor vehicle easier for the driver. If, for example, the disk spring stack is deflected at a point in the spring characteristic in such a way that a force must be expended for a, in particular, minimal additional compression, which is perceptible as a force jump, the spring element ensures, in particular, at this point, that the spring element, instead of the disk spring stack, is deflected until, as a result of the deflection of the spring element, the spring force is reached which is necessary in order to compress the disk spring stack. The spring element is designed preferably as a foam spring, elastomer spring, or wire spring.

According to an example embodiment of the present invention, the other end of the spring element is supported on the disk spring stack that has the lowest spring stiffness. An advantage of this is that when a brake pedal is actuated with a, in particular, minimal actuating force by the driver of the vehicle, in particular, at the start of a braking process, the spring characteristic exhibits a slight pitch and simulates a natural brake pedal force sensation. In the process, the spring element implements, in particular, a pre-tensioning force or a pre-tension of the at least one disk spring stack on which the spring element is supported. In general, it is the case that a disk spring stack/spring element that has a high spring stiffness exhibits a spring characteristic that has a steeper pitch than a disk spring stack/spring element that has a lower spring stiffness.

The spring stiffness is preferably adjustable using an arrangement of the individual disk springs of a respective disk spring stack. Thus, at least one first disk spring and at least one second disk spring of the disk spring stack can be situated in parallel and/or in mirror image to one another. In this arrangement, for example, two disk springs situated in mirror image to one another exhibit a lower spring stiffness than a single disk spring. Two disk springs situated in parallel to one another exhibit a higher spring stiffness than a single disk spring.

Preferably, the receiving recess is designed as a through-opening. An advantage of this is that the through-opening passes completely through the at least one disk spring stack, so that the spring element can fully extend through at least one disk spring stack. The spring element is preferably supported inside the through-opening of the disk spring stack on the disk spring stack itself and/or outside the through-opening on another disk spring stack. The through-opening is designed preferably at least essentially as a circular through-opening.

Preferably, at least two disk spring stacks adjacent to one another each includes a through-opening for the spring element. This ensures that the spring element extends at least essentially through two disk spring stacks connected in series and thus bridges two disk spring stacks. As a result, the spring characteristic is adapted as pressure is applied by the pressure piston, because then the spring stiffnesses of at least two disk spring stacks interact and generate a restoring force. This ensures that the simulated brake pedal force sensation corresponds even more closely to that of a vehicle having a hydraulic braking system, in particular, when the brake pedal is more intensively actuated. As pressure is applied by the pressure piston, the spring element preferably interacts initially with only one disk spring stack, in particular, with the disk spring stack on which the spring element is supported. In this case, the one disk spring stack and the spring element are compressed at least essentially completely by the pressure piston. The restoring force on the pressure piston increases with increasing compression of the first disk spring stack and of the spring element. If the restoring force corresponds to the force that is necessary in order to compress a second disk spring stack, through which the spring element extends, then the second disk spring stack is additionally deflected. This ensures, in particular, that a force jump in the spring characteristic is dampened when the second disk spring stack is deflected. Alternatively, the spring element interacts simultaneously with both disk spring stacks as pressure is applied. A length of the spring element corresponds preferably to at least essentially the axial elongation of the disk spring stacks, through which the spring element extends. The second disk spring stack preferably exhibits a higher spring stiffness than the first disk spring stack.

According to an example embodiment of the present invention, the spring element is designed as a coil spring or spiral spring. An advantage of this is that the coil spring or spiral spring is compact and can thus be situated in the receiving recess or through-opening in a space-saving manner. Thus, it is easily possible to connect or situate the spring element in series with at least one disk spring stack. An outer diameter of the coil spring or spiral spring preferably corresponds at least essentially to the diameter of the, in particular, circular receiving recess or through-opening, so that the coil spring or spiral spring is stably guided in the receiving recess or through-opening. The coil spring or spiral spring is preferably manufactured from an elastically deformable material that has a long service life, for example, metal, a metal alloy and/or plastic.

Preferably, each of the disk spring stacks includes a disk spring stack housing, in which the at least two disk springs are held, in particular, held pre-tensioned. An advantage of this is that the disk spring stacks are present as a manageable and compact unit. Accordingly, the disk stacks are easily mountable and/or demountable in the housing of the pedal force simulator device. By holding the disk springs pre-tensioned in the disk spring stack housing, it is ensured that the disk springs are usable or can be acted upon with a pressure force immediately after mounting in the housing of the pedal force simulator device. The disk spring stacks can preferably be situated, in particular, as a function of their spring stiffness, in arbitrary order in the housing of the pedal force simulator device. Each of the disk spring stack housings preferably has a shape that corresponds to a housing shape of the housing of the pedal force simulator device. If, for example, the housing has a hollow cylindrical design, which has a hollow cylinder inner diameter, then the disk spring stack housing is preferably designed as a cylinder, which has a cylinder outer diameter, the hollow cylinder inner diameter preferably corresponding at least essentially to the cylinder outer diameter. The disk spring stack housing preferably includes the through-opening.

According to an example embodiment of the present invention, the respective disk spring stack housing includes a first housing element and a second housing element, which are displaceable relative to each other for stressing the disk springs. An advantage of this is that the disk spring stack is compressible in a simple manner and without risk of damage. One of the housing elements preferably has an at least slightly larger housing element diameter than the other housing element. As a result, the housing elements are displaceable one into the other counter to their pre-tensioning force as pressure is applied. At least one of the housing elements is attached on at least one, in particular, an outer, disk spring of the disk spring stack, preferably using a joining process, for example, by welding, tuliping, or soldering.

Preferably, the first housing element and/or the second housing element of at least one of the disk spring stacks includes an axial stop that limits the maximum stressing of the disk springs. This results in an advantage that a mechanical loading or maximum deflection of the disk spring stack takes place only up to a predefinable point, and thus wear of the material of the disk spring stack is reduced. This increases, in particular, the service life of the disk spring stack, because a mechanical stressing is limited. By limiting the maximum deflection, it is also ensured that a fixed, predefinable, maximum restoring force is generated during maximum stressing. A spring characteristic of a disk spring stack is therefore precisely adjustable. The axial stop is designed, for example, as a rod-shaped element on the first housing element, which contacts the second housing element during a predefinable deflection of the first housing element and/or second housing element, and prevents a further deflection.

Preferably, the axial stop is designed as a sleeve on the first housing element that extends axially within the disk springs, and which interacts with a counter-stop of the second housing element for limiting the maximum stressing of the disk springs. An advantage of this is that a maximum deflection is predefined by the disk spring stack itself. The disk spring stack is therefore designed as an assembly that exhibits an individual spring characteristic having a maximum deflection and, therefore, a maximum producible restoring force. The sleeve is attached preferably to the first housing element of the disk spring stack, for example, using a joining process. A diameter of the sleeve corresponds preferably to the diameter of the receiving recess or of the through-opening. The axial stop, by preferably simultaneously forming the through-opening, is optimally situated in the disk spring stack. A section of the sleeve protrudes preferably at least partially beyond the first housing element and/or second housing element. This ensures that an additional disk spring stack can be situated on this section.

According to an example embodiment of the present invention, the first housing element and the second housing element are held against each other in a form-locked manner counter to the pre-tension of the disk springs. An advantage of this is that a stable shape of the disk spring stack housing is ensured. The pre-tension in this case is, in particular, a function of the maximum distance between first housing element and second housing element, which is limited by the form-lock. For the form-locked connection, the sleeve of the first housing element, in particular, includes a radially outwardly directed projection in the area of its axial stop. In the area of the radially outwardly directed projection of the first housing element, the second housing element preferably includes a radially inwardly directed projection. The form-locked connection takes place preferably by adjoining a top side of the radially outwardly directed projection to an underside of the radially inwardly directed projection, the top side and the underside being pre-tensioned in opposite directions by the disk springs and thereby engaging each other, or being held against each other. Thus, the maximum distance of the housing elements counter to the spring force is defined by the aforementioned projections and the pre-tension of the respective disk spring stack is adjusted as a result.

Preferably, the end face of the pressure piston facing the disk spring stacks is situated spaced apart from the disk spring stacks in the unactuated state of the pressure piston.

An advantage of this is that a resulting restoring force at the start of the pressure application is implemented solely by the spring element or the coil spring and by the at least one disk spring stack on which the spring element is supported. The spring element, together with the at least one disk spring stack on which the spring element is supported is, in particular, compressed as pressure is applied by the pressure piston, and the additional disk spring stacks are compressed only when the pressure piston has been deflected by the distance that corresponds to that of the spacing between the end face of the pressure piston and the disk spring stacks. In this case, the spring element ensures that a force jump is avoided when the pressure piston compresses the additional disk spring stacks and the restoring force increases as a result.

Preferably, the pressure piston includes an actuating pin introducible at least into the receiving recess, on which one end of the spring element is supported. This results in an advantage that a pre-tensioning force of the spring element is additionally adjustable, in particular, as a function of a length of the actuating pin. Thus, it is possible to adjust the pre-tension both as a function of the disk spring stack, on which the spring element is supported and as a function of a compression of the spring element by the actuating pin. The pre-tension of the spring element is preferably adjustable as a function of a length of the actuating pin when the spring element has a fixed predefined length.

Preferably, the pressure piston is hydraulically actuatable. An advantage of this is that a displacement of the pressure piston is easily produced by actuating the brake pedal. The pressure piston is situated preferably radially in the housing in a sealing manner, for example, by at least one sealing element, which is situated preferably between the pressure piston and the housing, and which prevents the hydraulic medium from entering the disk spring stacks. The housing preferably includes a hydraulic connection, through which a hydraulic medium is introducible into the housing, so that a hydraulic pressure is producible in order to displace the piston.

The present invention is to be explained in greater detail below with reference to the drawings.

DETAILED DESCRIPTION

Figure 1:
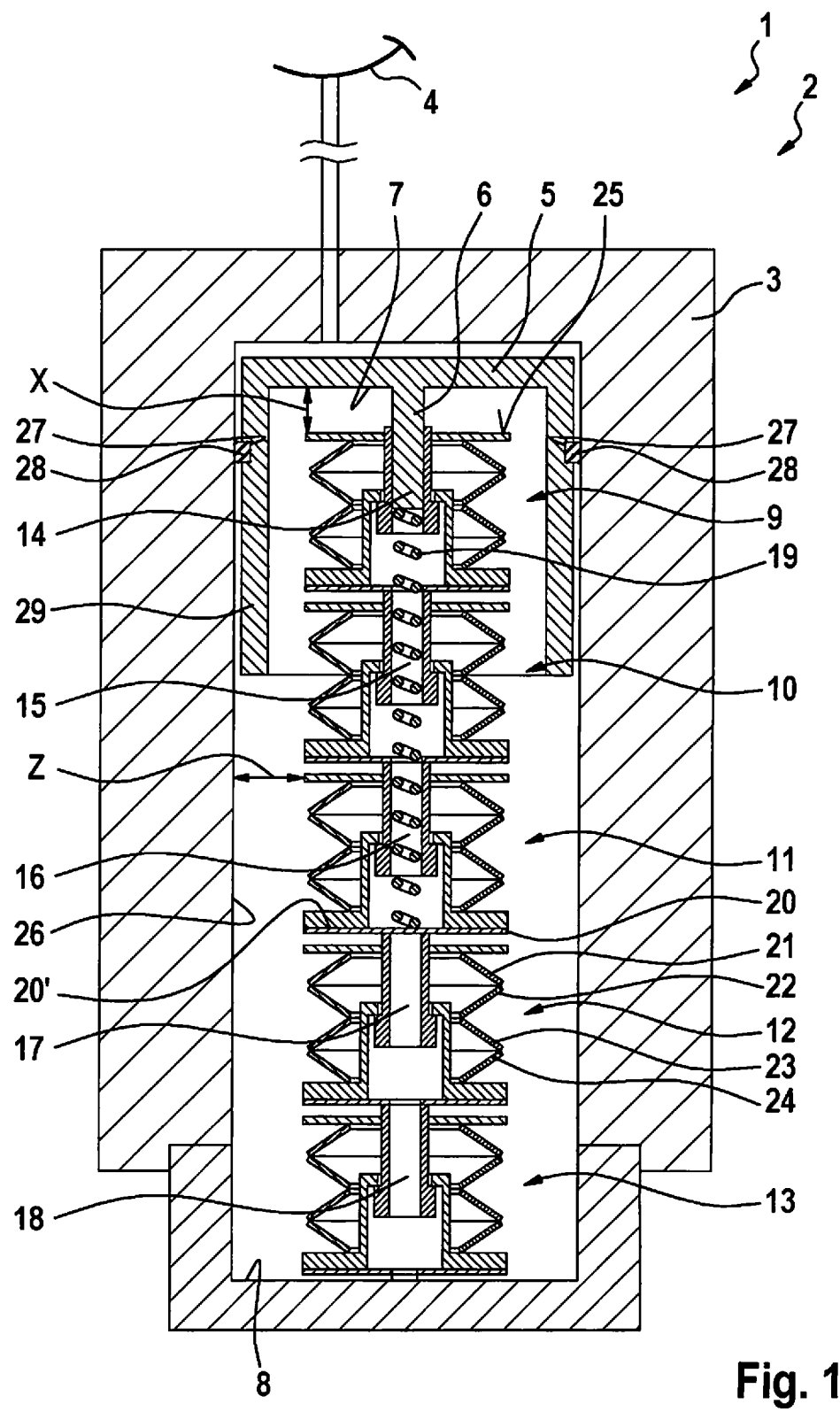
FIG. 1 shows a pedal force simulator device in a simplified side view according to an example embodiment of the present invention.

FIG. 1 shows a pedal force simulator device 1 of a vehicle 2 not depicted here, which includes, in particular, a housing 3 designed as a hollow cylinder, in which a pressure piston 5 that includes an actuating pin 6, is axially moveably mounted, and which is actuatable, in particular, by a brake pedal 4 of vehicle 2.

Multiple disk spring stacks 9-13 are connected in series or in a row one behind the other between an end face 7 of pressure piston 5 and an axial stop 8 of housing 3.

Disk spring stacks 9-13 adjoined in a row each includes an axial receiving recess 14-18, which is designed as a through-opening that includes a diameter. An elastically deformable spring element 19, in particular, a coil spring or spiral spring manufactured preferably of spring steel, is situated in the receiving recesses 14-16.

Spring element 19 is supported at one end on pressure piston 5, in particular, on actuating pin 6, and at the other end on disk spring stack 12, in particular, on a support element 20, which is preferably situated on disk spring stack 12 and is designed, in particular, as support disk 20'. Spring element 19 according to the example embodiment is connected in series to disk spring stacks 12, 13 due to its arrangement inside receiving recesses 14-16 of disk spring stacks 9-11. Alternatively, spring element 19 is supported on/in disk spring stack 12 in an area of receiving recess 17 of disk spring stack 12, for example, using a form-locked and/or force-fitting attachment.

Actuating pin 6 ensures that spring element 19 is already pre-tensioned or is at least partly compressed in an unactuated state of pressure piston 5, i.e., when a pressure force is not applied to pressure piston 5. The pre-tensioning force, with which spring element 19 is pre-tensioned between pressure piston 5 and disk spring stack 12, is therefore increased once again.

According to the present example embodiment, each disk spring stack 9-13, includes in each case four disk springs 21-24, which according to the example embodiment are identically situated in each disk spring stack 9-13. Disk spring 22 in this case is situated in mirror image or alternatingly relative to disk spring 21, disk spring 23 is situated in mirror image to disk spring 22, and disk spring 24 is situated in mirror image to disk spring 23. The present selected number and arrangement of disk springs 21-24 serves merely to describe an advantageous example embodiment. In principle, an arbitrary number of disk springs can be present in a disk spring stack, where the disk springs can be situated in an arbitrary manner relative to one another.

Disk springs 21-24 each preferably has an identical outer diameter and inner diameter. Disk springs 21-24 each preferably has a constant and/or variable spring constant. An overall spring constant or spring stiffness of disk spring stack 12 results from the alternating arrangement of disk spring stacks 21-24. The spring constants of individual disk springs 21-24 of a disk spring stack 9-13 can be the same or can differ from one another. It is also possible that at least two spring constants are the same, whereas the remaining spring constants differ therefrom.

Each disk spring stack 9-13 preferably has a unique spring stiffness that differs from the other disk spring stacks 9-13. According to the example embodiment, disk spring stack 12 exhibits the lowest spring stiffness and is therefore the softest disk spring stack 12. If a pressure force is applied by pressure piston 5 to disk spring stack 12 or to spring element 19 supported on disk spring stack 12, disk spring stack 12 then exhibits a spring characteristic with a smaller pitch than each of the other disk spring stacks 9-11, 13, which exhibit a greater spring stiffness.

Spring element 19, by being supported on disk spring stack 12, implements, in particular, the pre-tension of disk spring stack 12 and of disk spring stack 13 situated beneath it. Disk spring stack 13 preferably exhibits a greater spring stiffness than disk spring stack 12, but a lower spring stiffness than disk spring stacks 9-11.

Pressure piston 5 is preferably hydraulically actuatable. In order to prevent hydraulic medium, for example, hydraulic oil, from entering housing 3, pressure piston 5 includes a recess 27 between housing wall 26 and pressure piston 5, which is filled by a sealing ring 28.

Pressure piston 5 preferably has a flat, in particular, disk-shaped end face 7. In this case, disk spring stacks 9-13 preferably have a shape that corresponds to a housing shape of housing 3. Thus, disk spring stacks 9-13, have a cylindrical design, for example, so that they each have a diameter that corresponds to an inner diameter of the hollow cylindrically-shaped housing 3.

Alternatively, end face 7 of pressure piston 5 has a hollow cylindrically-shaped design. In this case, hollow cylindrically-shaped end face 7 of pressure piston 5 has a cylinder wall 29 preferably in the area of the outer diameter of end face 7, which extends axially in the direction of axial stop 8 and, for example, which surrounds at least in sections at least one disk spring stack 9. Disk spring stacks 9-13 in this case preferably have a diameter that is smaller than the inner diameter of housing 3. Cylinder wall 29 preferably has a wall thickness that corresponds essentially to difference Z between the inner diameter of housing 3 or to the diameter of housing wall 26 and the diameter of one disk spring stack 9-13.

When actuating pressure piston 5, a force is applied initially only to disk spring stacks 12, 13 by spring element 19, and thus a spring characteristic having a slight pitch or a slight restoring force is implemented on brake pedal 4. With increasing deflection of pressure piston 5, disk spring stacks 12, 13 preferably approach an end stop, at which the disk spring stacks reach their maximum deflection and generate a maximum restoring force. The end stop is explained later in greater detail.

With increasing compression/loading of disk spring stacks 12, 13 and of spring element 19, a maximum distance X ("jump-in distance") between end face 7 of pressure piston 5 and an end face 25 of disk spring stack 9 is preferably reduced. Distance X corresponds preferably to the distance that pressure piston 5 and uppermost disk spring stack 9 have relative to each other in the unactuated state of pressure piston 5. Distance X is reduced, in particular, when disk spring stacks 12, 13 are compressed or are maximally deflected and generate a maximum restoring force. Pressure piston 5 is then displaced preferably counter to the restoring force of spring element 19. Distance X between end face 7 of pressure piston 5 and end face 25 of disk spring stack 9 is reduced in the process. The restoring force on pressure piston 9 after a displacement by distance X, in which end face 7 of pressure piston 9 contacts end face 25 of disk spring stack 9, corresponds preferably to the force that is necessary to compress disk spring stacks 9-11 counter to their pre-tension.

This ensures that a force jump in the spring characteristic is avoided in the spring characteristic at the point at which end face 7 of pressure piston 5 contacts end face 25 of disk spring stack 9, or at which pressure piston 5 applies a pressure force to disk spring stacks 9-11. The dampening effect of spring element 19, in particular, in this point ensures that the spring characteristic is constant or uniform.

The generated restoring force in this case simulates a brake pedal force sensation on brake pedal 4, which corresponds to the brake pedal force sensation of a vehicle 2 that has a conventional hydraulic braking system.

It is advantageously possible with the pedal force simulator device 1 to implement spring characteristics having an arbitrary pitch and having an arbitrary shape, for example, linear or progressive spring characteristics.

Due to the individual lengths of actuating pin 6, it is possible to compensate for the geometric component tolerance without changing the force breadth of the individual springs. Preferably, the length of actuating pin 6 is adjustable. For this purpose, the actuating pin is designed, for example, to be telescopically extendable and/or retractable from the end face of the pressure piston. Thus, it is possible to compensate for a geometric component tolerance, in particular, a component tolerance-related deviation in the height of disk spring stacks and/or disk springs stacked on top of one another. A compensation of the component tolerance in this case is possible without changing the individual disk springs, for example, using a manual intervention, in which disk springs and/or disk spring stacks are replaced.

Figure 2:
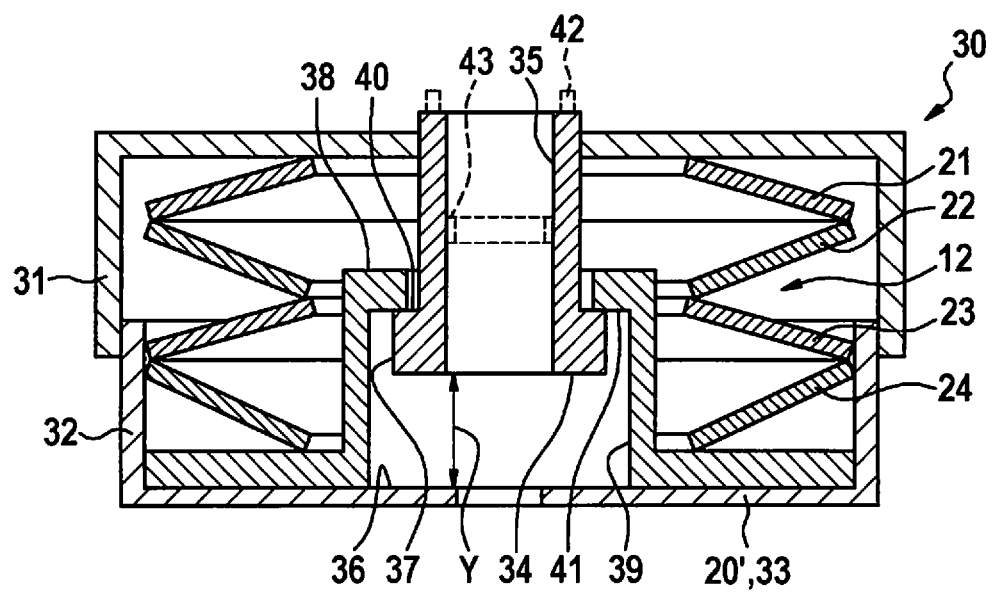
FIG. 2 shows a disk spring stack in a simplified side view according to an example embodiment of the present invention.

FIG. 2 shows disk spring stack 12, which includes disk springs 21-24. Disk springs 21-24 are situated according to the example embodiment described in FIG. 1. The arrangement is not limited to the example embodiment, however. Alternatively, it is also possible, for example, that at least two of the disk springs 21-24 are aligned in parallel to one another or that additional disk springs are situated in disk spring stack 12. Disk spring stacks 9-11, 13, are preferably designed similar to disk spring stack 12.

Disk spring stack 12 preferably has a disk spring stack housing 30, which holds, in particular, pre-tensioned, disk springs 21-24. Disk springs 21-24 are situated preferably loosely in disk spring stack housing 30. In this way, disk springs 21-24 can be removed individually from disk spring stack housing 30 and/or situated individually in disk spring stack housing 30. Disk springs 21-24 are held in disk spring stack housing 30, in particular by a pre-tension in disk spring stack housing 30, in such a way that they are unable to freely move within disk spring stack housing 30. In this way, rattling noises, for example, are also prevented.

Disk spring stack housing 30 includes a first housing element 31 and a second housing element 32. Housing elements 31, 32 are moveable relative to each other for stressing disk springs 21-24.

Second housing element 32 is assigned a support element 20, 33, in particular, a support disk. Support element 20, 33 is preferably a separate component, which can be situated in series with disk spring stack housing 30. Alternatively, support element 20, 33 is integrally connected to housing element 32.

First housing element 31 preferably has a larger diameter than second housing element 32, so that a relative axial shift of the two housing elements 31, 32 is possible, in which first housing element 31, in particular, is movable over second housing element 32. Alternatively, housing elements 31, 32 have an identical diameter.

In the present case, first housing element 31 includes an axial stop 34 which, as the previously mentioned end stop, limits a maximum stressing or deflection of disk spring stack 12. Alternatively or in addition, second housing element 32 includes an axial stop 34.

Axial stop 34 is designed preferably as a sleeve 35 on first housing element 31 extending axially within disk springs 21-24, which interacts on its end face with a counter-stop 36 of housing element 32 for limiting the maximum stressing of disk springs 21-24. Counter-stop 36 interacts preferably with separate support element 20, 33 to limit the maximum stressing of disk springs 21-24. Alternatively, counter-stop 36 interacts with support element 20, 33, which is integrally designed with second housing element 32.

Sleeve 35 has an at least essentially circular through-opening, via which spring element 19 is able to extend through disk spring stack 12 and to be supported on a disk spring stack 9-11, 13, which is situated adjacent to disk spring stack 12. Support element 20, 33 preferably has an inner diameter in the area of the circular through-opening of sleeve 35, which is smaller or equal in size to the diameter of the circular through-opening.

Sleeve 35 protrudes preferably at least in sections beyond first housing element 31. This ensures that a disk spring stack 9-11, 13 and/or a support disk 20, 33 can be situated on and held stable on disk spring stack 12.

First housing element 31 and second housing element 32 are advantageously held form-locked against each other counter to the pre-tension of disk springs 21-24. For this purpose, sleeve 35 has a radial projection 37 on its end facing counter-stop 36, which abuts a radial counter projection 38 of second housing element 32. Second housing element 32 preferably includes, in addition, an axial offset 39, which extends in the direction of first housing element 31. The form-locked connection takes place preferably by adjoining a top side 40 of radially outwardly directed projection 37 to an underside 41 of radially inwardly directed projection 38.

Projections 37 and 38 thus prevent housing elements 31 and 32 from being detachable from each other by the spring force of disk springs 21-24. Projections 37 and 38 ensure the cohesion of disk spring stack housing 30. In addition, the projections or their arrangement on respective housing elements 31, 32 define the maximum distance of housing elements 31, 32 from each other, and thus, the pre-tension exerted on disk springs 21-24. The distance or the positioning of projections 37 and 38 is expediently selected in such a way that disk springs 21-24 between housing elements 31 and 32 are pre-tensioned or at least partially compressed/elastically deformed, when projections 37 and 38 abut each other. The pre-tension also prevents rattling noises from occurring during operation.

Disk spring stack 12 optionally includes at least one attachment device 42, 43, which enables a, in particular, form-locked attachment of spring element 19 to disk spring stack 12. Attachment device 42, 43 is used, for example, to screw in spring element 19. In this way, a detent of spring element 19, in particular, a coil spring integrated into the respective disk spring stack, can be provided alternatively or in addition to support element 20.

However, it is preferably provided that spring element 19 is supported on aforementioned support disk 20' on the side of the disk spring stack. The support disk is placed, in particular, between disk spring stack 12 and disk spring stack 11, so that support disk 20' is supported on the one hand on disk spring stack 12 and on the other hand on spring element 19. Spring element 19 is thus held braceable or pre-tensioned directly between actuating pin 6 of pressure piston 5 and disk spring stack 12.

Preferably, support disk 20' is integrated in disk spring stack 11 situated above disk spring stack 12. For this purpose, as shown by way of example in FIG. 1, underlying housing element 32 of upper disk spring stack 11 includes a continuous bottom, i.e., a bottom with no openings, which forms support disk 20' or support element 33.

Disk spring stack 12 is therefore present in a pre-tensioned, compact and easily mountable form. Thus, disk spring stack 12, in particular, can be easily situated in housing 3 of pedal force simulator device 1, and can be used immediately after installation.

The respective end stop of individual disk spring stacks 9-13 in the direction of axial stop 8 of housing 3 in this case is adjustable individually as a function of a predefinable distance Y between axial stop 34 and support disk 33 or counter-stop 36. Additional means for limiting a maximum stressing of disk spring stacks 9-13 are therefore unnecessary. This ensures that a particularly accurate implementation of spring characteristics using disk spring stacks 9-13 and of spring element 19 is used.

Unlike the example embodiment shown in FIG. 1, disk spring stack 12 according to the example embodiment of FIG. 2 includes side walls on housing elements 31, 32, each of which circumferentially encloses disk springs 21-24 enclosed in disk spring stack housing 30, as a result of which the disk spring stack is protected from external influences. The side walls are understood to be optional, however and can also be omitted in disk spring stacks 9-13 as shown in FIG. 1.

Thus, pedal force simulator device 1 ensures that pre-definable spring characteristics are implementable, in spite of tolerance-related variations or deviations in the spring constants of individual, in particular, structurally identical disk springs 21-24 or disk spring stacks 9-13. Tolerance requirements from the automotive sector can therefore be met.

What is claimed is:

1. A pedal force simulator device comprising:
 a housing;
 a pressure piston that is actuatable by a brake pedal and is axially moveably mounted in the housing;
 a spring that is elastically deformable by the pressure piston;
 at least two disk spring stacks that are (a) arranged in the housing between an end face of the pressure piston and an axial stop formed by the housing and (b) connected in series, wherein:
  each of the disk spring stacks includes at least two disk springs;
  respective spring stiffnesses of at least two of the disk spring stacks differ from one another;
  at least one of the disk spring stacks includes a respective axial receiving recess in which the spring is situated with a first end of the spring being supported on the pressure piston and a second end of the spring, which is opposite the first end, being supported on one of the disk spring stacks.

2. The pedal force simulator device of claim 1, wherein the disk spring stack on which the second end of the spring is supported has a lowest spring stiffness of all of the disk spring stacks.

3. The pedal force simulator device of claim 1, wherein the receiving recess is a through-opening.

4. The pedal force simulator device of claim 1, wherein at least two of the disk spring stacks that are immediately serially adjacent to one another each includes the respective axial receiving recess formed as a through-opening for the spring.

5. The pedal force simulator device of claim 1, wherein the spring is a coil spring or spiral spring.

6. The pedal force simulator device of claim 1, wherein each of the disk spring stacks includes a respective disk spring stack housing holding the respective disk springs of the respective disk spring stack, which are pre-tensioned.

7. The pedal force simulator device of claim 6, wherein each of the disk spring stack housings includes a first housing element and a second housing element that is moveable relative to the first housing element for stressing the disk springs.

8. The pedal force simulator device of claim 7, wherein at least one of the first and second housing elements of at least one of the disk spring stacks includes an axial stop that limits a maximum stressing of the disk springs.

9. The pedal force simulator device of claim 8, wherein the axial stop is a sleeve on the first housing element, extends axially within the disk springs, and interacts with a counter-stop of the second housing element for limiting the maximum stressing of the disk springs.

10. The pedal force simulator device of claim 7, wherein the first and second housing elements are held form-locked against each other counter to the pre-tension of the disk springs.

11. The pedal force simulator device of claim 1, wherein the end face of the pressure piston facing the disk spring stacks is spaced apart from the disk spring stacks in an unactuated state of the pressure piston.

12. The pedal force simulator device of claim 1, wherein the pressure piston includes an actuating pin insertable at least into at least one of the at least one receiving recess and on which one end of the spring is supported.

13. The pedal force simulator device of claim 1, wherein the pressure piston is hydraulically actuatable.

\* \* \* \* \*